United States Patent
Doan et al.

(10) Patent No.: US 8,626,541 B2
(45) Date of Patent: Jan. 7, 2014

(54) SYSTEM FOR MANAGING LOADING OPERATIONS OF HAUL VEHICLES

(75) Inventors: Tien Dzung Doan, Morton, IL (US);
William Edward Allen, Peoria, IL (US);
John James Krone, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1470 days.

(21) Appl. No.: 11/896,382

(22) Filed: Aug. 31, 2007

(65) Prior Publication Data
US 2009/0063222 A1 Mar. 5, 2009

(51) Int. Cl.
*G06Q 10/00* (2012.01)

(52) U.S. Cl.
USPC .......................................... 705/7.11; 705/1.1

(58) Field of Classification Search
USPC .................. 705/1.1, 7.11–7.42, 13, 400–418
See application file for complete search history.

(56) References Cited

U.S. PATENT DOCUMENTS

| | | | |
|---|---|---|---|
| 4,591,705 A | 5/1986 | Toudou | |
| 5,822,224 A | 10/1998 | Nakanishi et al. | |
| 5,848,368 A | 12/1998 | Allen et al. | |
| 5,897,595 A | 4/1999 | Hawkins et al. | |
| 5,913,914 A | 6/1999 | Kemner et al. | |
| 5,925,081 A | 7/1999 | Hawkins et al. | |
| 5,931,875 A | 8/1999 | Kemner et al. | |
| 5,937,386 A * | 8/1999 | Frantz ............................. | 705/15 |
| 5,961,560 A | 10/1999 | Kemner | |
| 6,600,418 B2 * | 7/2003 | Francis et al. ............. | 340/572.1 |
| 7,194,384 B2 | 3/2007 | Olsson | |
| 2004/0073468 A1 | 4/2004 | Vyas et al. | |
| 2004/0136816 A1 | 7/2004 | Pulli et al. | |
| 2006/0106742 A1 * | 5/2006 | Bochicchio et al. .......... | 705/414 |
| 2006/0131382 A1 * | 6/2006 | Thatcher ....................... | 235/376 |
| 2006/0217993 A1 | 9/2006 | Anderson | |
| 2007/0210156 A1 * | 9/2007 | Bochicchio ................... | 235/385 |
| 2007/0222600 A1 * | 9/2007 | Reeves et al. .............. | 340/572.4 |
| 2007/0260380 A1 * | 11/2007 | Mintah et al. .................... | 701/50 |
| 2008/0011839 A1 * | 1/2008 | Noll et al. ...................... | 235/384 |

FOREIGN PATENT DOCUMENTS

GB    2158598    11/1985

OTHER PUBLICATIONS

"http://www.bmgseltec.com," web page from Internet address, Dec. 5, 2006, retrieved from http://web.archive.org/web/20040921220011/www.bmgseltec.com/.

* cited by examiner

*Primary Examiner* — George Chen
(74) *Attorney, Agent, or Firm* — Finnegan, Henderson, Farabow, Garrett & Dunner LLP (57) ABSTRACT

A loading system for use with a haul vehicle and a loading machine configured to load material onto the haul vehicle is disclosed. The loading system has an identification tag located on the haul vehicle, an identification tag reader configured to recognize the identification tag, and a transmitter configured to deliver a first signal including information related to the identification tag. The loading system also has a transceiver configured to receive the first signal and deliver a second signal including loading information to the loading machine to initiate loading of the haul vehicle.

23 Claims, 3 Drawing Sheets

SYSTEM FOR MANAGING LOADING OPERATIONS OF HAUL VEHICLES

TECHNICAL FIELD

The present disclosure is directed to a system for managing loading operations and, more particularly, to a system for managing loading operations of haul vehicles.

BACKGROUND

In worksites such as, for example, quarries, loading machines including wheel loaders, backhoe loaders, track-type loaders, and other types of loaders are used to load material onto haul vehicles. Because the loading machine is an integral part of the quarry operation, it is usually under control of the quarry. Typically, the haul vehicles (e.g., dump-trucks) are not owned by the quarries, but by individual customers. This usually requires quarry personnel to interact with each haul vehicle operator every time they come to the quarry to determine who the customer is and the type and the amount of material desired by the customer. Also, payload information such as, for example the desired type and amount of material for each haul vehicle, needs to be communicated to the quarry personnel who operate the loading machine. Verbal interaction between quarry personnel and haul vehicle operators can be time consuming and prone to error.

The haul vehicle typically drives into the quarry through an entrance where the haul vehicle is identified by quarry personnel. The quarry personnel then dispatch a loading machine to meet the haul vehicle at a particular site to load a desired amount of material onto the haul vehicle. To determine if the haul vehicle has been loaded with the desired amount of material, the haul vehicle is usually driven onto scales and weighed. If the haul vehicle is overloaded, some of the material must be removed. Similarly, if the haul vehicle is underloaded, more material must be added. In these overloading and underloading situations, the haul vehicle must re-cycle through the quarry, returning to the loading site so that the amount of material in the haul vehicle can be modified and to the scales so that the modified payload can be verified. This re-cycle process costs additional time, fuel, and money.

Once the final amount of the material loaded onto the haul vehicle is measured, the measurement is then used for billing and other purposes. These administrative tasks require quarry personnel to correctly match each haul vehicle with a corresponding customer so that an appropriate bill can be delivered to the haul vehicle operator before the operator leaves the quarry. These tasks can also be prone to error. For example, the quarry personnel may deliver the bill to the wrong haul vehicle operator.

One method of improving the efficiency of loading operations at a worksite is disclosed in U.S. Pat. No. 5,848,368 ("the '368 patent") issued to Allen et al. The '368 patent discloses a method for controllably loading haul vehicles with a material by a mobile loading machine. Each of the haul vehicles has a identification tag located on it. An identification tag reader, located on the mobile loading machine, reads the identification tag and responsively produces a haul vehicle identification signal. The mobile loading machine accesses a customer data file, which includes at least a desired amount of material. The customer data file and the haul vehicle identification signals are compared. A load command signal is produced in response to the comparison. The mobile loading machine loads the haul vehicle in response to the load command signal. The mobile loading machine includes a payload monitoring system to determine the actual amount of material being loaded onto the haul vehicle by the mobile loading machine. The determined actual amount of material is compared with the desired amount of material. Once the value for the actual amount of material loaded onto the haul vehicle is determined, the customer data file is updated accordingly and a customer communication such as a bill including the value of the actual amount of material is prepared in response to the updated customer data file.

While the method of the '368 patent may improve the efficiency of loading operations at a worksite by automating many of the quarry-related tasks, its effectiveness may be limited. Specifically, because the method of the '368 patent relies on a payload monitoring system included in the mobile loading machine, the actual amount of material loaded onto the haul vehicle may be inaccurately determined. In particular, over time, the payload monitoring system may drift away from a calibrated setting to give erroneous readings resulting in an over-reporting or under-reporting of the actual amount of material loaded onto the haul vehicle. These misreported results may persist from the payload monitoring system until the payload monitoring system is re-calibrated. Further, because each mobile loading machine may be associated with a different payload monitoring system, different measurements for the same amount of material may be reported, thus leading to inconsistent measurements of the material loaded during different loading operations at the same worksite.

The method of the '368 patent may also be limited in its efficiency. In particular, because the presence of a haul vehicle may be determined by an RFID reader included in a mobile loading machine, it may be difficult to keep track of how many haul vehicles are at the worksite and how much time the haul vehicle remains at the quarry while for a loading operation. For example, two haul vehicles may be present at the quarry for loading, and each haul vehicle may be recognized by a different mobile loading machine. Because the mobile loading machines may be unaware of when the haul vehicles arrived at or left the quarry and because the presence of both haul vehicles may be unknown to either mobile loading machine, customers may be unable to accurately assess the productivity of the quarry's loading operations.

The disclosed system is directed to overcoming one or more of the problems as set forth above.

SUMMARY OF THE INVENTION

One aspect of the present disclosure is directed to a loading system for use with a haul vehicle and a loading machine configured to load material onto the haul vehicle. The loading system includes an identification tag located on the haul vehicle, an identification tag reader configured to recognize the identification tag, and a transmitter configured to deliver a first signal including information related to the identification tag. The loading system also includes a transceiver configured to receive the first signal and deliver a second signal including loading information to the loading machine to initiate loading of the haul vehicle.

Another aspect of the present disclosure is directed to a method for managing loading operations of a haul vehicle at a loading site. The method includes identifying the haul vehicle at a location prior to the loading site, and responsively producing an identification signal. The method also includes determining a desired amount of material to load onto the haul vehicle based on the identification signal, and responsively producing a load command signal.

DETAILED DESCRIPTION

Figure 1:
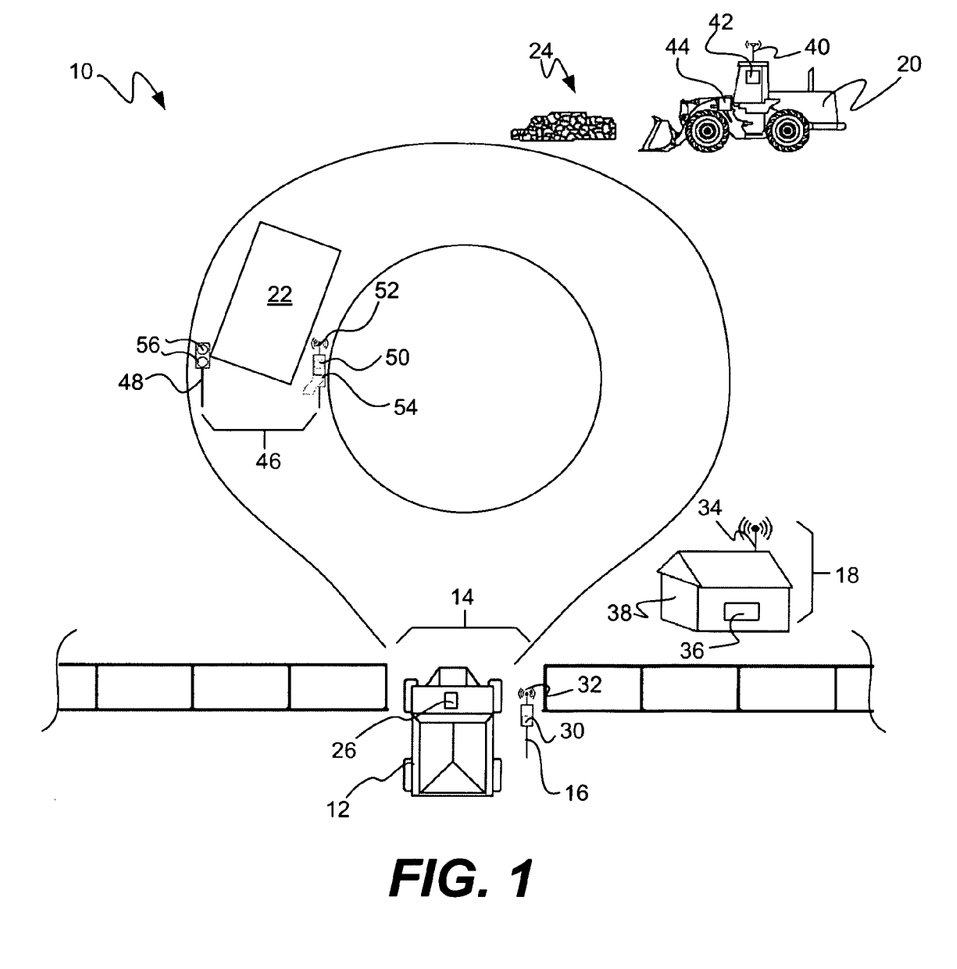
FIG. 1 is a diagrammatic illustration of an exemplary disclosed worksite.

FIG. 1 illustrates a worksite 10 including a haul vehicle 12, a gate 14 associated with a first communications sub-system 16, a second communications sub-system 18, a loading machine 20, and a scale 22. Worksite 10 may include, for example, a quarry, a mine site, a landfill, a construction site, a road work site, or any other type of worksite. Various tasks and work operations may be performed at worksite 10 including, among other things, loading operations. That is, worksite 10 may include a material 24, which may be loaded onto or into haul vehicle 12 to be removed from worksite 10. It is contemplated that worksite 10 may also include a designated loading site where material 24 may be loaded onto haul vehicle 12.

Haul vehicle 12 may embody any type of mobile machine operable to haul material 24. In one example, haul vehicle 12 may embody a haul truck having a cargo bed. Haul vehicle 12 may include an identification tag 26, such as, for example, an RFID tag, to identify haul vehicle 12. It should be appreciated that each haul vehicle 12 at worksite 10 may be associated with a unique identification tag 26, and/or that multiple haul vehicles 12 may be associated with a particular customer or other entity and that identification tag 26 may include information identifying the customer.

Gate 14 may be any type of entrance to and/or exit from worksite 10. First communications sub-system 16 may be associated with gate 14 to at least partially control or monitor passage through gate 12. For example, first communications sub-system 16 may permit only authorized vehicles to enter worksite 10.

First communications sub-system 16 may be positioned at or near gate 14 and may include an identification tag reader 30 to read identification tag 26 of haul vehicle 12. For example, identification tag reader 30 may include an RFID-type reader. First communications sub-system 16 may be operable to deliver an identification signal including, for example, an identifier determined based on a recognition of identification tag 26. As such, first communications sub-system 16 may also include a transmitter 32. Transmitter 32 may embody, for example, a wireless transmitter or transceiver. It should be appreciated, however, that transmitter 32 may additionally or alternatively embody any number of other software components and/or wireless or wired hardware components suitable for transmitting and/or receiving information. It is contemplated that first communications sub-system 16 may additionally include any number of other components such as, for example, a processor, a microprocessor, a memory, a storage device, etc. It is also contemplated that first communications sub-system 16 may alternatively be located anywhere in worksite 10 prior to the loading site. For example, first communications sub-system 16 may be located along a path of haul vehicle 12 before the loading site.

Second communications sub-system 18 may include a transceiver 34 operable to receive and deliver information, and a data source 36. Transceiver 34 may embody, for example, a wireless transceiver. It should be appreciated, however, that transmitter 34 may additionally or alternatively embody any number of other software components and/or wireless or wired hardware components suitable for transmitting and/or receiving information. Transceiver 34 may be communicatively coupled with data source 36. Data source 36 may include customer data associated with haul vehicle 12. For example, data source 36 may include the identifier of haul vehicle 12, a description of haul vehicle 12, a type of material, a predetermined tare weight of haul vehicle 12 (e.g., when haul vehicle 12 is not hauling any material 24), an expected payload amount for haul vehicle 12, and information related to the customer associated with haul vehicle 12, such as, for example, the customers' name, and the customers' billing address. It is contemplated that data source 36 may embody any appropriate data source such as, for example, one or more computer systems, databases, etc. It is also contemplated that second communications sub-system 18 may additionally include any number of other components such as, for example, a processor, a microprocessor, a memory, a storage device, etc.

Second communications sub-system 18 may be operable to receive the identification signal from first communications sub-system 16, use the identification signal to retrieve data from data source 36, and deliver a load command signal including at least a portion of the retrieved data to loading machine 20 to initiate a loading operation. Second communications sub-system 18 may be located anywhere at worksite 10, such as, for example, at a scale house 38. It should be appreciated that second communications sub-system 18 may alternatively be located at a remote region of worksite 10, if desired.

Loading machine 20 may embody any type of loading machine, such as, for example, a wheel loader. It should be appreciated that worksite 10 may include any number of mobile or stationary loading machines 20. Loading machine 20 may be operable to receive and/or deliver information and may include a transceiver 40 and an identification tag reader 42, such as, for example, an RFID-type reader, to read identification tag 26 of haul vehicle 12. For example, transceiver 40 may embody a wireless transceiver. It should be appreciated, however, that transceiver 40 may additionally or alternatively embody any number of other software components and/or wireless or wired hardware components suitable for transmitting and/or receiving information.

Loading machine 20 may also include a payload monitoring system 44 operable to determine an amount of material 24 being loaded onto haul vehicle 12. Payload monitoring system 44 may be communicatively coupled with transceiver 40. For example, loading machine 20 may receive the load command signal from second communications sub-system 18. Loading machine 20 may then load haul vehicle 12 with material 24, and payload monitoring system 44 may determine the amount of material 24 being loaded onto haul vehicle 12 and compare the amount to the expected payload amount included in the load command signal. Payload monitoring system 44 may also be self-calibrated. For example, payload monitoring system 44 may adjust its measurements based on a reference value. The reference value may include, for example, the payload amount as measured by another device (e.g., scale 22). Thus, payload monitoring system 44 may be operable to compare the payload amount measured by scale 22 to the payload amount measured by payload monitoring system 44 in order to determine a delta value indicative of a difference therebetween, and adjust its measurements by the delta value (e.g., by actively subtracting or adding the delta value, as appropriate). It should be appreciated that the reference value may alternatively include any other reference value such as, for example, the delta value.

It is contemplated that loading machine 20 may load material 24 incrementally. That is, loading machine 20 may include a loading tool, such as, for example, a bucket, which may load material 24 by discrete amounts. As such, payload monitoring system 44 may monitor a number of loading increments used to load haul vehicle 12, and may use the number of loading increments and an amount of material 24 included in each loading increment to determine the total amount of material 24 loaded onto haul vehicle 12. It should be appreciated that the amount of material 24 included in each loading increment may be predetermined and/or stored in a memory or storage device of payload monitoring system 44. Loading machine 20 may also be operable to deliver a payload signal including, for example, an amount of material 24 per loading increment (e.g., per bucket of loading machine 20), the number of loading increments (e.g., number of buckets) loaded onto haul vehicle 12, and at least one time-stamp.

Scale 22 may include any type of weighing device suitable to determine a weight or payload amount of haul vehicle 12. For example, scale 22 may include a bridge scale. Scale 22 may also include, located at or near scale 22, a third communications sub-system 46 and an interface 48.

Third communications sub-system 46 may be operable to receive and/or deliver information and may include a transceiver 52 and an identification tag reader 50, such as, for example, an RFID-type reader, to read identification tag 26 of haul vehicle 12. Transceiver 52 may embody, for example, a wireless transceiver. It should be appreciated, however, that transceiver 52 may additionally or alternatively embody any number of other software components and/or wireless or wired hardware components suitable for transmitting and/or receiving information. Transceiver 52 may be operable to deliver a weight signal including at least an identifier of haul vehicle 12 and the weight of haul vehicle 12 to second communications sub-system 18 and/or loading machine 20. That is, third communications sub-system 46 may be communicatively coupled with scale 22 to receive the weight of haul vehicle 12. Third communications sub-system 46 may further be operable to determine whether the weight of haul vehicle 12 falls within a predetermined range of the desired weight of haul vehicle 12. For example, third communications sub-system 46 may receive the desired weight of haul vehicle 12 via transceiver 52, and may compare the desired weight to the weight determined by scale 22 to determine whether the weight determined by scale 22 falls within a predetermined range of the desired weight. It is contemplated that the predetermined range may be stored within a memory or storage device of third communications sub-system 46.

Third communications sub-system 46 may additionally include a printer 54 configured to produce a printed communication related to the loading of haul vehicle 12. For example, printer 54 may print an invoice for delivery to the operator of haul vehicle 12 or customer associated with haul vehicle 12. Additionally or alternatively, printer 54 may print a report for the customer including, for example, an amount of time it took to load haul vehicle 12. It should be appreciated that printer 54 may alternatively be located elsewhere at worksite 10, such as, for example, at scale house 38, if desired.

Interface 48 may include any number of indicators, lights, displays, arrows, etc., configured to convey information to the operator of haul vehicle 12. For example, interface 48 may include one or more traffic lights 56 to direct the operator to steer haul vehicle 12 out of worksite 10 or back to loading machine 20. In another example, interface 48 may alternatively or additionally include a text display, such as, for example, an LED display, to report the weight of haul vehicle 12 and/or any other information desired to the operator.

Figure 2:
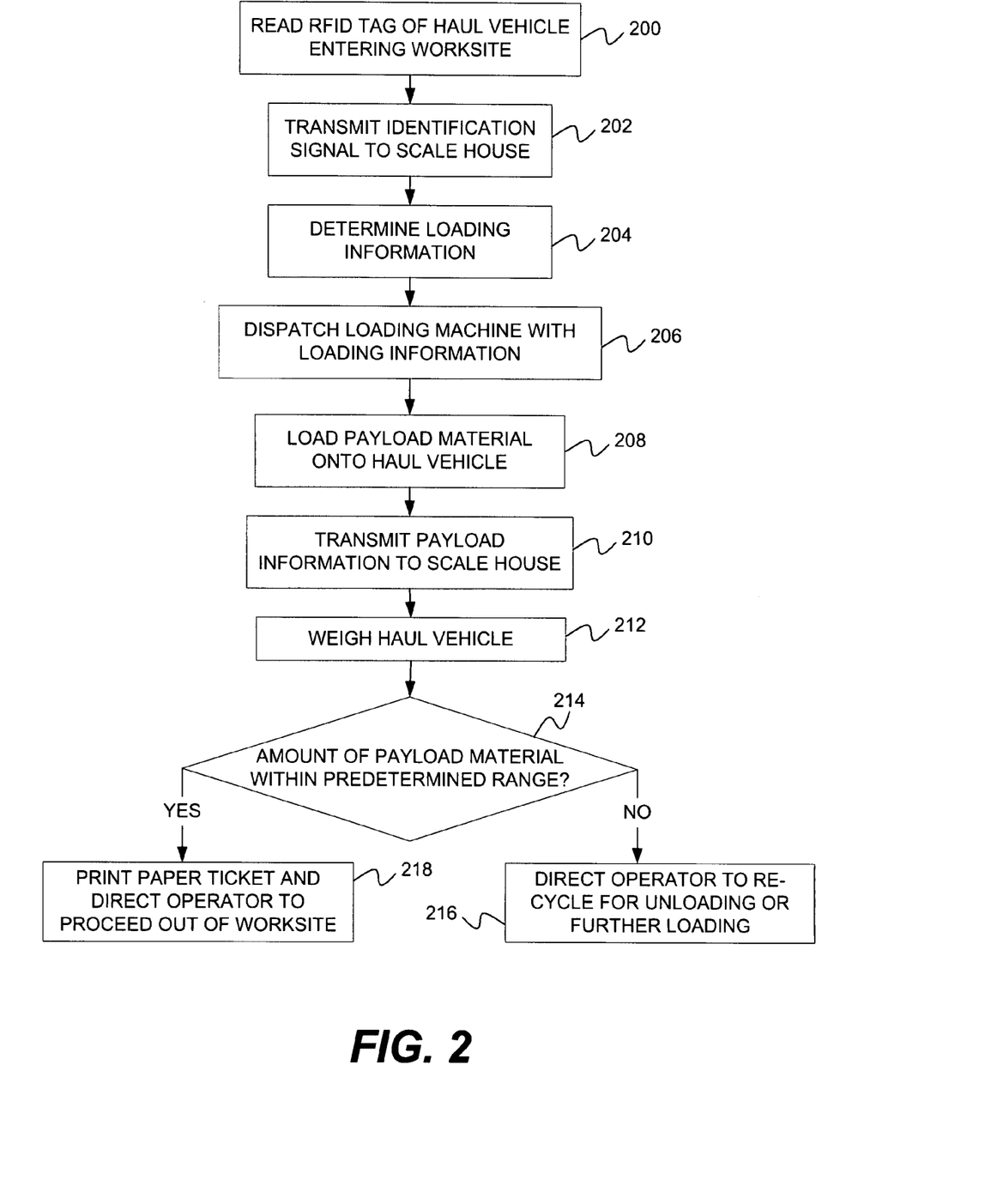
FIG. 2 is a flowchart illustration of an exemplary operation of the worksite of FIG. 1.

FIG. 2 illustrates an exemplary operation of the disclosed loading system, and will be described in detail below.

INDUSTRIAL APPLICABILITY

The disclosed loading system may provide for efficient loading of a haul vehicle through a network of communications sub-systems. The disclosed loading system may minimize or eliminate re-cycles of the haul vehicle in order to load the haul vehicle with an expected amount of material while streamlining the loading. More specifically, the disclosed loading system may recognize the haul vehicle as it enters a worksite, when it is being loaded with material, and when it is being weighed to verify the amount of material loaded onto it. The disclosed loading system may also streamline the billing process while providing a customer with information that may be helpful in making tactical decisions. That is, the disclosed loading system may monitor the loading operation and include one or more details about the loading operation on a printed communication, which may be delivered to an operator of the haul vehicle at the end of the loading operation. The amount of material loaded onto the haul vehicle may be measured by a scale, transmitted to a loading machine, and used to determine a reference value for calibrating a payload monitoring system of the loading machine. Thus, the disclosed loading system may also provide for in-situ calibration of the payload monitoring system. The operation of the disclosed loading system will now be described.

Referring to FIG. 1, haul vehicle 12 may enter worksite 10 through gate 14. It is contemplated that haul vehicle 12 may be registered the first time it comes to worksite 10. Registration may include the process of obtaining information about a customer associated with haul vehicle 12, such as the name of the customer and billing address associated with haul vehicle 12, and storing the information in data source 36. Registration may also include associating identification tag 26 with haul vehicle 12 by, for example, storing an identifier associated with identification tag 26 in data source 36. Alternatively, all or a portion of the data acquired during registration may be communicated to data source 36 in any other manner. For example, the name of the customer, the billing address associated with haul vehicle 12, and the identifier associated with identification tag 26 may be stored in data source 36 prior to haul vehicle 12 entering worksite 10. Further, it is contemplated that all or a portion of the data acquired during registration may alternatively or additionally be stored in the memories and/or storage devices of first, second, and/or third communications sub-systems 16, 18, 46.

Referring now to FIG. 2, when haul vehicle 12 enters worksite 10, identification tag reader 30 of first communications sub-system 16 may read identification tag 26 to determine the identifier associated with haul vehicle 12 (Step 200). First communications sub-system 16 may then deliver the identifier to second communications sub-system 18 at scale house 38 (Step 202). More specifically, first communications sub-system 16 may include the identifier in an identification signal, and transmit the identification signal to second communications sub-system 18 via transmitter 32. It is contemplated that first communications sub-system 16 may additionally transmit other information to second communications sub-system 18, such as, for example, a time-stamp.

Second communications sub-system 18 may then determine loading information based on the identifier (Step 204). For example, second communications sub-system 18 may use the identifier to access loading information for haul vehicle 12 stored in data source 36. The loading information may include, for example, a description of haul vehicle 12, a type of material to be loaded onto haul vehicle 12, and a desired payload amount for haul vehicle 12. Some or all of the loading information may have been previously communicated to data source 36 in the form of an electronic and/or paper customer order including, for example, the customer's desired type and amount of material 24.

Second communications sub-system 18 may then deliver the loading information to loading machine 20 (Step 206). More specifically, second communications sub-system 18 may include the loading information in a load command signal and transmit the load command signal to loading machine 20 via transceiver 34. Loading machine 20 may receive the load command signal via transceiver 40. It should be appreciated that upon receiving the load command signal, loading machine 20 may be dispatched to load haul vehicle 12. For example, loading machine 20 may be driven from a first location of worksite 10 (e.g., scale house 38) to a second location (e.g., the loading site) of worksite 10, where it may rendezvous with haul vehicle 12. Identification tag reader 42 of loading machine 20 may read identification tag 26 to, for example, verify that haul vehicle 12 is the machine that loading machine 20 has been dispatched to load.

Loading machine 20 may then load material 24 onto haul vehicle 12 (Step 208). For example, loading machine 20 may incrementally lift material 24 (e.g., by the bucket-full), and load it onto haul vehicle 12. As loading machine 20 loads haul vehicle 12, payload monitoring system 44 may determine an amount of material 24 being loaded onto haul vehicle 12 such that haul vehicle 12 may be loaded with about the desired amount of material 24 (e.g., as requested by the load command signal information received via transceiver 40). In determining the amount of material 24 being loaded onto haul vehicle 12, payload monitoring system 44 may determine any number of other values related to the amount of payload loaded onto haul vehicle 12. For example, payload monitoring system 44 may monitor the number of bucket-fulls of material 24 loaded onto haul vehicle 12, and compare the number of bucket-fulls with the amount of material 24 per bucket-full to determine the amount of material 24 being loaded onto haul vehicle 12.

Loading machine 20 may then deliver payload information to second communications sub-system 18 of scale house 38 (Step 210). More specifically, loading machine 20 may include the payload information in a payload signal and deliver the payload signal to second communications sub-system 18 via transceiver 40. The payload information may include, for example, the identifier of haul vehicle 12, at least one time-stamp, and/or an indication of the determined actual amount of material loaded onto haul vehicle 12, such as, for example, the amount of material 24 per bucket-full and the number of bucket-fulls of material 24 loaded onto haul vehicle 12. It is contemplated that the payload information may additionally or alternatively include any other information, if desired. The payload signal may be received by second communications sub-system 18 via transceiver 34.

After being loaded with material 24, haul vehicle 12 may then proceed to scale 22, to be weighed (Step 212). Identification tag reader 50 of third communications sub-system 46 may read identification tag 26 to determine the identifier associated with haul vehicle 12. The weight of mobile machine 12, as measured by scale 22, may be displayed on interface 48. It is contemplated that other information may additionally or alternatively be displayed on interface 48 before, during, and/or after the weighing of haul vehicle 12. The weight of haul vehicle 12 may also be used to verify the amount of material 24 loaded onto haul vehicle 12. It is contemplated that the tare weight of haul vehicle 12 may be communicated to third communications sub-system 46 in any manner such as, for example, via a wireless transmission from second communications sub-system 18. The weight of haul vehicle 12 may be compared to the tare weight of haul vehicle 12 stored in the memory and/or storage device of third communications sub-system 46. It should be appreciated that the weight of haul vehicle 12 may alternatively be compared to another predetermined weight of haul vehicle 12, such as, for example, the fully loaded weight of haul vehicle 12, to verify the amount of material 24 loaded onto haul vehicle 12. It is also contemplated that the amount of material 24 loaded onto haul vehicle 12 may alternatively be determined by second communications sub-system 18. For example, second communications sub-system 18 may compare the weight of haul vehicle 12 as determined by scale 22 to the tare weight of haul vehicle 12.

The determined amount of material 24 may then be compared to the desired amount of material 24 to determine whether the amount of material 24 loaded onto haul vehicle 12 falls within a predetermined range of the desired amount (Step 214). The comparison of the determined amount of material 24 and the desired amount of material 24 may be carried out by second and/or third communications sub-systems 18, 46. For example, second communications sub-system 18 may deliver the desired amount of material 24 to third communications sub-system 46, and third communications sub-system 46 may compare the determined amount of material 24 to the desired amount of material 24. Third communications sub-system 46 may deliver the results of the comparison to second communications sub-system 18 via transceiver 52. For example, transceiver 52 may deliver a weight signal including at least an identifier of haul vehicle 12, the weight of haul vehicle 12 to second communications sub-system 18, and the result of the comparison.

The operator of haul vehicle 12 may be directed based on the comparison of the determined amount of material 24 to the desired amount of material 24. For example, if it is determined that the amount of material 24 loaded onto haul vehicle 12 is outside the predetermined range of the desired weight stored in the memory and/or storage device of third communications sub-system 46, the operator may be directed to return haul vehicle 12 to loading machine 20 to correct the amount of material 24 loaded onto haul vehicle 12 (Step 216). More specifically, the operator may be directed to return haul vehicle 12 to the loading site so that loading machine 20 may remove at least a portion of material 24 from haul vehicle 12 or load additional material 24 onto haul vehicle 12. The operator may be directed by interface 48. For example, one or more of traffic lights 56 may be illuminated to indicate that the operator should direct haul vehicle 12 to return haul vehicle 12 to loading machine 20. It should be appreciated, however, that the operator of haul vehicle 12 may be directed in any other manner, such as, for example, by one or more messages displayed on the LED of interface 48. It is contemplated that, upon detecting that the amount of material 24 loaded onto haul vehicle 12 is outside the predetermined range, third communications sub-system 46 may deliver a fault signal to second communications sub-system 18 indicating that payload monitoring system 44 of loading machine 20 may have inaccurately determined the amount of material 24 loaded onto haul vehicle 12. In this manner, second communications sub-system 18 may alert quarry personnel that payload monitoring system 44 may require recalibration, repair and/or replacement.

Alternatively, if it is determined that the amount of material 24 loaded onto haul vehicle 12 is within the predetermined range, the loading operation may end (Step 218). For example, the operator of haul vehicle 12 may be directed to proceed out of worksite 10. For example, one or more of traffic lights 56 may be illuminated to indicate that the operator should direct haul vehicle 12 to proceed out of worksite 10. It should be appreciated, however, that the operator of haul vehicle 12 may be directed in any other manner, such as, for example, by one or more messages displayed on the LED of interface 48.

Further, printer 54 may print a communication for delivery to the operator of haul vehicle 12 and/or customer associated with haul vehicle 12. The printed communication may include, for example, an invoice or any other type of report including information related to the loading of haul vehicle 12, such as the amount of material 24 loaded onto haul vehicle 12 and/or one or more time-stamps. It should be appreciated that interface 48 may further indicate that the operator may pick up the printed communication, for example, at printer 54. Alternatively or additionally, the printed communication may be delivered to the customer in any other manner, such as, for example, via post. It should also be appreciated that printer 54 may additionally print a report for the customer including, for example, an amount of time it took to load haul vehicle 12.

Figure 3:
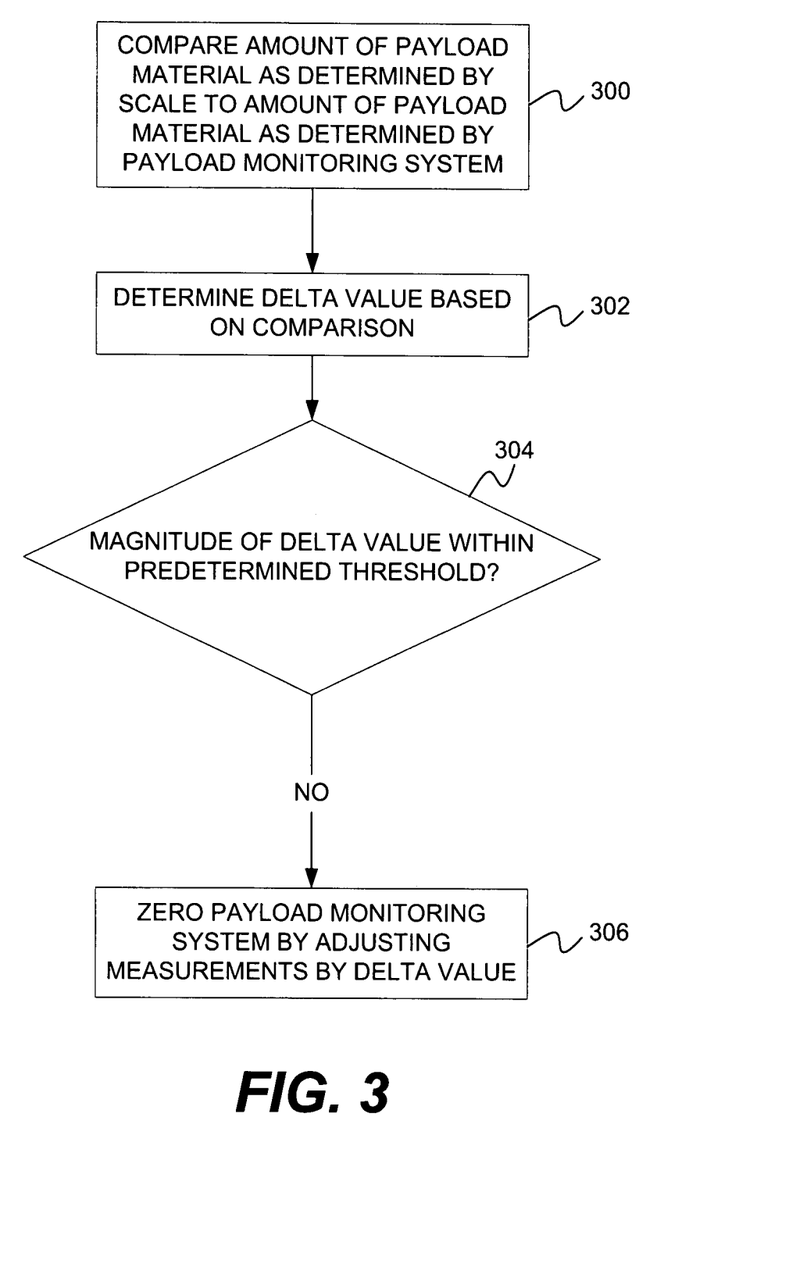
FIG. 3 is a flowchart illustration of another exemplary operation of the worksite of FIG. 1.

The amount of material 24, as determined by scale 22, may also be used to recalibrate payload monitoring system 44. FIG. 3 illustrates an exemplary recalibration operation for payload monitoring system 44. Referring now to FIG. 3, the amount of material 24, as determined by scale 22 may be compared to the amount of material as determined by payload monitoring system 44 (Step 300). This comparison may be carried out, for example, by loading machine 20, second communications sub-system 18, and/or third communications sub-system 46. As such, it is contemplated that loading machine 20 may deliver, via transceiver 40, the amount of material 24 as determined by payload monitoring system 44 to second communications sub-system 18 and/or third communications sub-system 18. The comparison may be used to determine a delta value (Step 302). The delta value may be positive or negative, and may indicate an amount by which payload monitoring system 44 may be recalibrated to obtain substantially more accurate readings of the amount of material 24 loaded onto haul vehicle 12. The magnitude delta value may then be compared to a predetermined threshold to determine whether the reading of the amount of material 24 loaded onto haul vehicle 12 may be substantially accurate (Step 304). If the magnitude of the delta value is greater than the threshold, then payload monitoring system 44 may be recalibrated (Step 306). For example, payload monitoring system 44 may recalibrate itself by adjusting a tare weight reading of an empty bucket of loading machine 20 by the delta value. It should be appreciated, however, that the delta value may additionally or alternatively indicate that the readings of payload monitoring system 44 may be undesirably affected by other factors such as, for example, wear and tear, dust, moisture, etc.

The disclosed loading system and method may provide for efficient control over a loading operation while minimizing the amount of re-cycles needed for the haul vehicle to be properly loaded. Specifically, because the disclosed loading system may use both a payload monitoring system included in a loading machine and a scale to measure the amount of material loaded onto the haul vehicle, the actual amount of material loaded onto the haul vehicle may be determined with an increased or maximized degree of accuracy. In particular, the measurements of the scale may verify the measurements of the payload monitoring system, thus essentially detecting inaccurate measurements of the payload monitoring system.

Over time, the payload monitoring system may drift away from a calibrated setting to yield inaccurate measurements resulting in over-reporting or under-reporting of the actual amount of material loaded onto the haul vehicle. Thus, if the haul vehicle is directed to re-cycle after being weighed by the scale, the re-cycle may indicate that the payload monitoring system of the loading machine may require recalibration, repair, and/or replacement. By detecting that the payload monitoring system may require recalibration, repair, and/or replacement after as few as one inaccurate measurement, the payload monitoring system may be recalibrated, repaired, and/or replaced before making more inaccurate measurements that may lead to undesired re-cycles, thus saving time and/or money during loading operations. Further, the payload monitoring system may be recalibrated in-situ, thus reducing or eliminating recalibration costs.

Further still, because multiple loading machines may be associated with respective payload monitoring systems in the disclosed loading system, inconsistent measurements among the payload monitoring systems may be partially or entirely avoided. Similarly, because the same scale may be used to measure the amount of payload loaded on a haul vehicle during each loading operation, inconsistent measurements between separate loading operations may be partially or entirely avoided.

The disclosed loading system may further provide an efficient system for streamlining loading of a haul vehicle at a worksite. Specifically, because identification tag readers may be used to identify the haul vehicle at an entrance to the worksite and at a scale of the worksite, and because systems at the entrance to the worksite, the scale, and a loading machine of the worksite may be in communication with each other, the process of loading the haul vehicle may be efficiently monitored. That is, the amount of time taken to load the haul vehicle and the number of re-cycles required may be monitored. Because this information may be included in a report for the customer, the loading system may aide the customer in effectively making tactical decisions in order to achieve short term improvements as well as providing the customer with productivity information to enable the customer to make long term strategic decisions.

It will be apparent to those skilled in the art that various modifications and variations can be made to the loading system of the present disclosure without departing from the scope of the disclosure. Other embodiments will be apparent to those skilled in the art from consideration of the specification and the practice of the loading system disclosed herein. It is intended that the specification and examples be considered as exemplary only, with a true scope of the disclosure being indicated by the following claims and their equivalents.

What is claimed is:

1. A loading system for use at a worksite with a haul vehicle and a loading machine configured to load material onto the haul vehicle, the loading system comprising:
   an identification tag located on the haul vehicle;
   an identification tag reader associated with a loading site and configured to recognize the identification tag;
   a transmitter configured to deliver a first signal including information related to the identification tag in response to the identification tag reader recognizing the identification tag; and
   a transceiver configured to:
     receive the first signal and deliver a second signal including loading information to the loading machine to initiate loading of the haul vehicle;

receive, from the loading machine after loading of the haul vehicle, first information indicative of an amount of material loaded into the haul vehicle; and receive, from a source at the worksite different from the loading machine, second information indicative of the amount of material loaded into the haul vehicle by the loading machine, the source at the worksite measuring the amount of material loaded into the haul vehicle; and a communications sub-system associated with the transceiver and configured to:

compare the second information indicative of the amount of material loaded into the haul vehicle with a target amount of material;

generate a signal indicating success of the loading operation if the second information indicative of the amount of material loaded into the haul vehicle is within a predetermined range of the target amount; and generate a fault signal if the second information indicative of the amount of material loaded into the haul vehicle is not within the predetermined range of the target amount, wherein the fault signal is identified as indicative of an error associated with the first information.

2. The loading system of claim 1, wherein the loading machine includes a payload monitoring system configured to:

estimate the amount of material loaded onto the haul vehicle by the loading machine;

generate the first information indicative of an amount of material loaded into the haul vehicle; and provide the first information to the transceiver.

3. The loading system of claim 2, wherein:

the identification tag reader is a first identification tag reader;

the transceiver is a first transceiver;

the loading machine includes:

a second identification tag reader configured to recognize the identification tag; and a second transceiver configured to deliver a third signal including payload information to the first transceiver; and the payload information includes at least one of an identifier of the haul vehicle, an amount of material per a loading increment, the amount of material estimated by the payload monitoring system, a number of loading increments, or a time-stamp.

4. The loading system of claim 3, wherein:

the second transceiver is further configured to receive the second information indicative of the amount of material loaded onto the haul vehicle; and the payload monitoring system is further configured to be recalibrated based on a comparison of the estimated amount of material loaded onto the haul vehicle and the second information.

5. The loading system of claim 2, wherein the communications sub-system associated with the transceiver is configured to determine a delta value indicative of a difference between the first information and the second information, and initiate recalibration of the payload monitoring system if a magnitude of the delta value is above a predetermined delta value threshold.

6. The loading system of claim 1, further including a scale configured to weigh the haul vehicle, wherein the scale is configured to determine the second information indicative of an amount of material loaded into the haul vehicle based on the weight of the haul vehicle.

7. The loading system of claim 6, wherein:

the identification tag reader is a first identification tag reader;

the transceiver is a first transceiver; and the scale includes:

a second identification tag reader configured to recognize the identification tag; and a second transceiver configured to deliver a third signal including at least an identifier of the haul vehicle and the weight of the haul vehicle to the first transceiver.

8. The loading system of claim 7, wherein the scale further includes an interface having at least one of a text display and at least one light to convey information to an operator of the haul vehicle.

9. The loading system of claim 1, wherein:

the identification tag is an RFID tag; and the identification tag reader is an RFID-type reader.

10. The loading system of claim 1, wherein:

the loading system further includes an entrance to the worksite;

the identification tag reader is located at the entrance; and the identification tag is recognized when the haul vehicle enters the worksite through the entrance.

11. The loading system of claim 1, further including a scale house, wherein the transceiver is located at the scale house.

12. The loading system of claim 1, wherein the loading machine is dispatched by the transceiver.

13. The loading system of claim 1, wherein the loading information includes at least one of an identifier of the haul vehicle, a description of the haul vehicle, a type of material to be loaded onto the haul vehicle, or an expected payload amount.

14. The loading system of claim 1, further including a printer configured to produce a printed communication including at least one of an identifier of the haul vehicle, a description of the haul vehicle, a type of material to be loaded onto the haul vehicle, an expected payload amount, a determined amount of material loaded onto the haul vehicle, an amount of payload per a loading increment, a number of loading increments, a time-stamp, and a weight of the haul vehicle.

15. A method for managing loading operations of a haul vehicle at a worksite, comprising:

identifying the haul vehicle at-an entrance to the worksite;

producing an identification signal in response to the identification of the haul vehicle at the entrance to the worksite;

determining a desired amount of material to load onto the haul vehicle based on the identification signal;

producing a load command signal based on the determined desired amount of material;

receiving, from a loading machine after loading of the haul vehicle, first information indicative of an amount of material loaded into the haul vehicle;

receiving, from a source at the worksite different from the loading machine, second information indicative of an amount of material loaded into the haul vehicle by the loading machine, the source at the worksite measuring the amount of material loaded into the haul vehicle;

comparing, by a processor, the second information indicative of the amount of material loaded into the haul vehicle with the desired amount;

generating, by the processor, a signal indicating success of the loading operation if the second information indicative of the amount of material loaded into the haul vehicle is within a predetermined range of the desired amount; and generating, by the processor, a fault signal if the second information indicative of the amount of material loaded into the haul vehicle is not within the predetermined range of the desired amount, wherein the fault signal is identified as indicative of an error associated with the first information.

16. The method of claim 15, wherein the first information indicative of the amount of material loaded into the haul vehicle includes payload information calculated by a payload monitoring system of the loading machine.

17. The method of claim 15, wherein receiving second information indicative of the amount of material loaded into the vehicle includes:
receiving, from a communications system associated with a scale, a payload signal;
determining a weight of the haul vehicle; and
producing a weight signal based at least on the determined weight of the haul vehicle.

18. The method of claim 15, wherein:
the fault signal includes instructions for directing the operator of the haul vehicle to return to the loading site; and
the signal indicating success of the loading operation includes instructions for directing the operator of the haul vehicle to leave an associated worksite.

19. The method of claim 17, further including generating a report based on at least one of the identification signal, the payload signal, and the weight signal.

20. The method of claim 17, further including storing information included in at least one of the identification signal, the payload signal, and the weight signal.

21. The method of claim 17, wherein the weight signal includes an identifier of the haul vehicle and the weight of the haul vehicle.

22. The method of claim 15, further including determining a delta value indicative of a difference between the first information and the second information, and
initiating recalibration of a payload monitoring system associated with the loading machine if a magnitude of the delta value is above a predetermined delta value threshold.

23. A system for use at a worksite, comprising:
a haul vehicle including an RFID tag;
a loading machine configured to load material onto the haul vehicle, wherein the loading machine includes:
a payload monitoring system configured to determine an amount of material loaded onto the haul vehicle;
a transceiver configured to:
receive a load command signal including loading information for the haul vehicle; and
transmit a payload signal including at least information related to the amount of material loaded onto the haul vehicle;
an entrance to the worksite;
a first communications sub-system associated with the entrance, wherein the first communications subsystem includes:
an RFID-type reader configured to identify the RFID tag as the haul vehicle passes through the entrance; and
a transmitter configured to deliver an identification signal including at least information related to the identified identification tag;
a second communications sub-system including a transceiver configured to:
receive the identification signal;
deliver the load command signal to the transceiver of the haul vehicle to initiate loading of the haul vehicle; and
receive, from the loading machine after loading of the haul vehicle, first information indicative of the amount of material loaded into the haul vehicle by the loading machine;
a scale disposed at the worksite and configured to weigh the haul vehicle;
a third communications sub-system located at the scale and including:
an RFID-type reader configured to identify the RFID tag as the haul vehicle is weighed; and
a transmitter configured to transmit second information indicative of the amount of material loaded into the haul vehicle by the loading machine, as measured by the scale, the second information including at least the weight of the haul vehicle; and
a printer configured to produce a printed communication for an operator of the haul vehicle;
wherein the
transceiver of the second communications sub-system is configured to receive the second information indicative of the amount of material loaded into the haul vehicle by the loading machine, and wherein the second communications sub-system is further configured to:
compare the second information indicative of the amount of material loaded into the haul vehicle with a target amount of material;
generate a signal indicating success of the loading operation if the second information indicative of the amount of material loaded into the haul vehicle is within a predetermined range of the target amount;
generate a fault signal if the second information indicative of the amount of material loaded into the haul vehicle is not within the predetermined range of the target amount, wherein the fault signal is identified as indicative of an error associated with the first information;
determine a delta value indicative of a difference between the first information and the second information; and
initiate recalibration of the payload monitoring system if a magnitude of the delta value is above a predetermined delta value threshold.

* * * * *